United States Patent [19]

Marshall, Jr.

[11] Patent Number: 4,685,859

[45] Date of Patent: Aug. 11, 1987

[54] MISSILE PART ASSEMBLY AND TRANSPORT CART

[75] Inventor: George C. Marshall, Jr., Claremont, Calif.

[73] Assignee: General Dynamics, Pomona Division, Pomona, Calif.

[21] Appl. No.: 840,128

[22] Filed: Mar. 12, 1986

[51] Int. Cl.$^4$ ............................................. B66F 11/00
[52] U.S. Cl. ........................................ 414/590; 269/287; 269/71; 280/79.1 A
[58] Field of Search ............... 414/589, 590, 680; 248/129, 137, 138, 140, 142; 280/79.1 A; 269/287, 71; 89/1.51, 1.58, 1.59; 901/1

[56] References Cited

U.S. PATENT DOCUMENTS

| | | | |
|---|---|---|---|
| 1,606,400 | 11/1926 | Cheney | 248/142 |
| 2,270,203 | 1/1942 | Saunders | 269/17 |
| 2,424,692 | 7/1947 | Harshberger | 414/680 |
| 2,505,723 | 4/1950 | Rees | 248/142 |
| 2,613,822 | 10/1952 | Stanley | 214/1 |
| 2,741,830 | 4/1956 | Lewis | 269/17 |
| 2,920,773 | 1/1960 | Knabe | 214/1 |
| 2,955,632 | 10/1960 | Stone | 269/17 |
| 3,038,614 | 6/1962 | Morley et al. | 414/590 |
| 3,067,884 | 12/1962 | Williams | 269/17 |
| 3,085,798 | 4/1963 | Gavette | 269/17 |
| 3,087,630 | 4/1963 | Karnow et al. | 414/590 |
| 3,194,525 | 7/1965 | Webb | 269/17 |
| 3,218,056 | 11/1965 | Kaplan et al. | 269/17 |
| 3,262,664 | 7/1966 | Paraskewik | 414/590 |
| 3,268,093 | 8/1966 | Keiter | 414/590 |
| 3,858,864 | 1/1975 | Waldow | 269/17 |
| 3,973,685 | 8/1976 | Loomer | 901/1 |
| 4,010,942 | 3/1977 | Ward | 269/17 |
| 4,239,196 | 12/1980 | Hanger | 269/17 |
| 4,425,751 | 1/1984 | Bousseau et al. | 901/1 |
| 4,461,455 | 7/1984 | Mills et al. | 414/590 |

FOREIGN PATENT DOCUMENTS

| | | | |
|---|---|---|---|
| 1025783 | 2/1978 | Canada | 269/287 |
| 4715596 | 4/1969 | Japan | 248/142 |

Primary Examiner—Robert J. Spar
Assistant Examiner—Donald W. Underwood
Attorney, Agent, or Firm—Neil F. Martin; Edward B. Johnson

[57] ABSTRACT

A retention collar rigidly attaches to a missile guidance assembly, and a transport cart lifts, supports, transports, and lowers the retention collar and thereby a retained assembly. The retention collar comprises a pair of trunnions for attachment to a workpiece, such as a missile guidance assembly, and for positioning on opposite sides of the workpiece. The transport cart includes a movable base with a frame attached thereto. The frame includes left and right side frame members which support a pair of rotatable bearing members so positioned to engage a corresponding one of the retention collar trunnions. A slot in each bearing member engages a collar trunnion. The slots include a bearing position at which the trunnion is held and which is raised or lowered by rotating the bearing member. The trunnions may also be rotated while at the bearing position. A frame/bearing locking pin selectively prevents rotation relative to the frame of the rotatable bearing member. A bearing/collar locking pin selectively prevents rotation of the retention collar relative to the bearing member. A work/storage table specifically adapted to accomodate the cart includes a plurality of work station support surfaces adapted to fit between the cart left and right side frames, thereby permitting the cart and a retained retention collar to engage a workpiece over the support surface.

6 Claims, 7 Drawing Figures

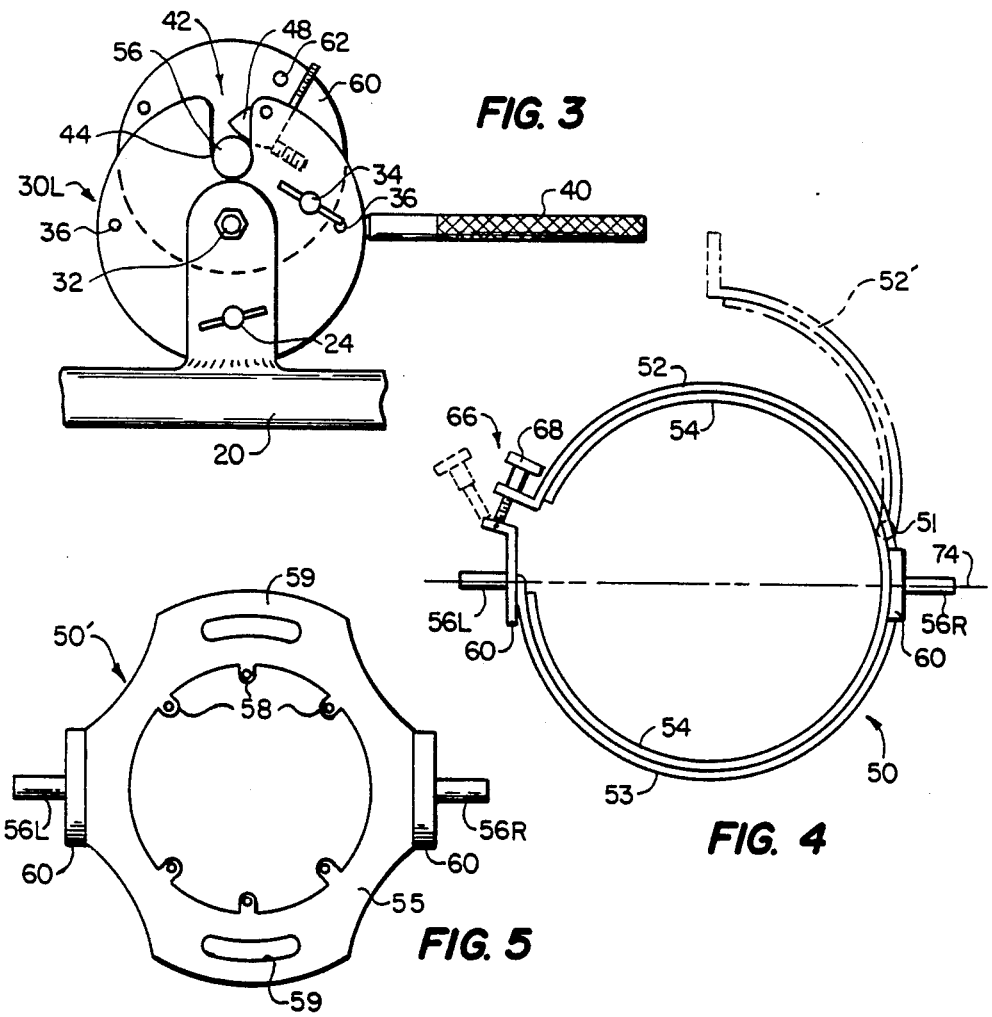
FIG. 3
FIG. 4
FIG. 5
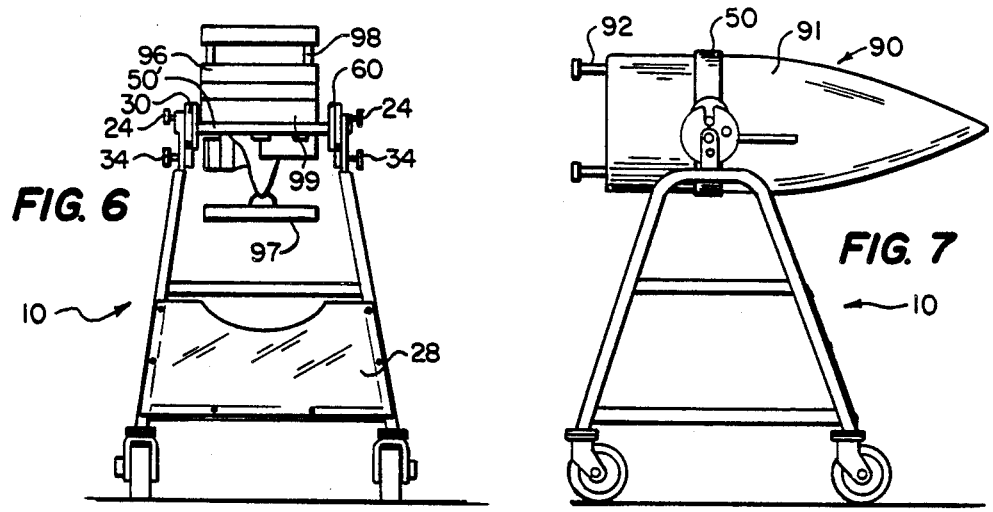
FIG. 6
FIG. 7

MISSILE PART ASSEMBLY AND TRANSPORT CART

The government has rights to this invention pursuant to contract number N00024-83-C-5515 awarded by the United States Navy.

BACKGROUND OF THE INVENTION

1. Field of the Invention

This invention relates in general to workpiece transport carts and more specifically involves a cart and workpiece retaining collar combination and a work/storage table specifically adapted to accommodate a preferred embodiment of the cart.

2. Background of the Invention

The assembly of a workpiece, such as a missile guidance section or missile guidance assembly, requires many operations, each requiring the appropriate parts and tools. Typically, the missile guidance assembly is moved from work station to work station during assembly, so that the specialized tools and specialized personnel can perform each particular assembly operation. Missile guidance assemblies, in particular, are not easily handled and transported. They are heavy, have no good handling surfaces, and, if damaged, repairs are difficult and expensive. There has therefore been a need for a transport cart which includes means for safely securing a missile guidance assembly and lifting and transporting it between work stations.

In the assembly of missile guidance assemblies and in the re-work of such assemblies which involves removal of non-functioning electronic plates and the like, it would often be expeditious to support the assembly in a manner in which it may be rotated or flipped upside down without the upper components, including the RF antenna, being contacted. There has therefore been a need for a transport cart and workpiece securing apparatus which also functions as an assembly station and which will allow for rotation of a retained workpiece.

Typically missile guidance assemblies are tested in a horizontal position by attaching them to a test fixture. Therefore, it is desirable that a transport cart be adapted to hold the assembly under test in a horizontal position and support the assembly for attachment to the test fixture.

Because missile guidance assemblies are often transported large distances within the manufacturing facility for storage or shipping, it is further desirable that such a transport cart be extremely stable so as to not easily tip over.

Different assemblies, and the same assembly during different stages of assembly, have different configurations. It is not possible to secure the various configurations with a single device. Therefore, it is desirable to have a common means by which a multiplicity of assembly retaining means can interface with and attach to a cart.

SUMMARY OF THE INVENTION

The invention comprises the combination of a retention collar for rigid attachment to a workpiece, such as a missile guidance assembly, and a transport cart for lifting, supporting, transporting, and lowering the retention collar and thereby a retained workpiece. The retention collar comprises a pair of trunnions for attachment to a workpiece, for positioning on opposite sides of a workpiece. The center axis of the trunnions define a collar-mounting axis.

The transport cart includes a movable base having mobility members, such as casters. Attached to the base is a cart frame which includes left and right side frames extending upward to support a pair of rotatable bearing members. The pair of rotatable bearing members are rotatably attached to the frame, and each is positioned to engage a corresponding one of the trunnions on the workpiece retention collar. A slot in the rotatable bearing member engages a trunnion. The trunnion is held in the slot at a bearing position which is raised or lowered by rotating the bearing member. Also, once it is supported at the bearing position, the trunnions and attached workpiece may be rotated. A spring loaded locking pin passing through the frame may be inserted into a bore and the rotatable bearing member for selectively preventing rotation of the bearing member relative to the frame.

The retention collar includes a trunnion plate at the base of the trunnion. The plate contains one or more bores. A spring loaded locking pin passing through the bearing member may be selectively inserted in a plate bore for selectively preventing rotation of the retaining collar relative to the bearing member. The retaining collar may have various configurations including a substantially circular collar with a hinged, swing open side for clamping around and onto a workpiece or may include other attachment means such as means for bolting onto the workpiece.

An assembly/storage table contains openings or slits between work/storage platforms. Each platform is designed to fit between left and right side frame members of the cart, and the slits are of a width to allow entry of the cart side frames. This allows the cart to secure a workpiece which is on the platform.

Other features and many attendant advantages of the invention will become more apparent upon a reading of the following detailed description together with the drawings, wherein like reference numerals refer to like parts throughout.

BRIEF DESCRIPTION OF THE DRAWING

FIG. 3 is a side view of the cart-collar interface components.

FIG. 4 is a top view of an embodiment of a clamping collar with phantom lines showing the open position.

FIG. 5 is an alternate embodiment of a retaining collar.

FIG. 6 is a view of the cart and collar of FIG. 5 showing a retained missile guidance assembly flipped over for rework.

FIG. 7 is a side elevation view of the cart and collar of FIG. 4 combination illustrating rotation of a retained assembly while it is being carried by the cart.

DETAILED DESCRIPTION OF THE INVENTION

Figure 1:
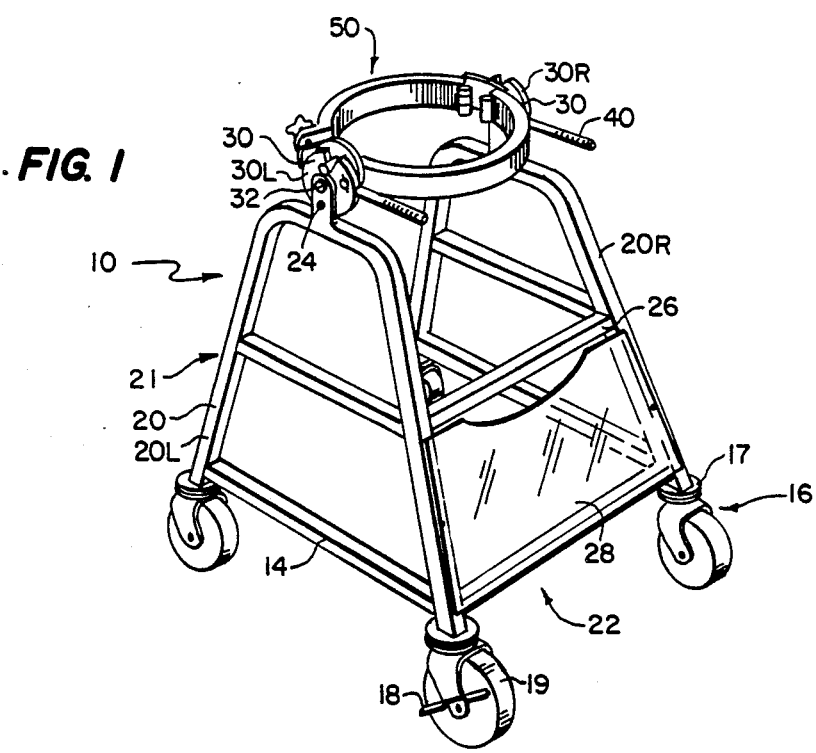
FIG. 1 is a perspective view of the assembly and transport cart of the present invention.

With reference now to the drawing, and in more particularly to FIG. 1 thereof, there is shown an embodiment of the transport cart, shown generally as 10, of the present invention. Transport cart 10 generally comprises: base 14, frame 20, rotatable bearing member 30, and a detachable collar, retention collar 50, for attachment to a work piece, such as a missile part assembly. Retention collar 50 is best seen in FIG. 4 and an alternate embodiment is shown in FIG. 5.

Attached to the cart base 14 are mobility members, such as casters 16. Preferably, casters 16 include a swivel mount 17 to allow for turning and steering of cart 10. Also preferably, one or more of the casters includes a braking mechanism 18 for locking wheel 19 and thereby holding the cart in a fixed position. Cart frame 20 is attached to base 14 and includes left and right side frames 20L, 20R which extend upward to support a pair of rotatable bearing members 30. The rotatable bearing members 30 interact with and support collar 50. Frame cross-member 26 joins left side and right side frame members. The rear of the cart 22, includes document holder 28 for holding and transporting documents related to a retained work piece or assembly. Document holder 28 is attached to the frame in any suitable manner.

Cart frame 20 supports a pair of rotatable bearing members, left bearing member 30L and right bearing member 30R, each rotatable mounted on left side frame 20L and right frame 20R respectively. Bearing members 30 are rotatably mounted on frame 20 by any suitable means such as with axis pin 32 which defines the axis of rotation of bearing member 30. Spring loaded locking pin, frame/bearing pin 24, passes through frame 20 may engage one of several bores 36 in rotatable bearing member 30 to prevent rotation of bearing member 30 relative to frame 20. Bearing member 30 may contain a plurality of bores 36 so that it may be locked in a plurality of rotation positions. Added leverage means, such as handle 40, is attached to bearing member 30 to aid in rotation of the bearing member around pin 32.

The other features and workings of rotatable bearing member 30 which interacts with collar 50 will best be understood by first describing the retention collar 50. FIG. 4 is an enlarged top elevation view of the retention collar 50 of FIG. 1. Collar 50 surrounds and is firmly clamped onto a work piece such as a missile guidance assembly. Retention collar 50 generally comprises hinged clamping member 52, stationary clamping member 53, left and right trunnions 56L, 56R, and trunnion plate 60. A coating 54 on the inside surface of clamping members 52, 53 of strong resilient material aids collar 50 in securely retaining a work piece and without damaging the work piece. Hinge clamping member 52 is attached to the other collar components with hinge 51. Adjustable fastening means, such as swing open bolt assembly 66, attaches the non-hinged end of hinged clamping member 52 in the closed position to the remainder of the collar. Collar 50 may be opened by loosening locking bolts, such as hand knob bolt 68, and rotating it to the left as shown by the phantom lines in FIG. 4. Hinged clamping member 52 then may be rotated about hinge 51 to an open position, shown by phantom lines 52, so that it may be placed around a work piece. After being placed around a work piece, collar 50 is again fastened with bolt assembly 66 and hand knob 68 is turned down to close the inner collar diameter and securely retain the work piece.

Collar 50 includes a pair of trunnions, 56L, 56R which are positioned on opposite sides of the collar to define a collar mounting axis 74. The collar also includes trunnion plate 60 disposed at the base of at least one of the trunnions. The structure and function of trunnion plate 60 is described in greater detail below.

FIG. 5 illustrates an alternate embodiment of the retention collar, shown generally as assembly collar 50'. Assembly collar 50' is specifically designed to be bolted to a work piece, such as a missile guidance assembly, during the assembly or rework process. Assembly collar 50' generally comprises support structure ring 55, left and right trunnions 56L, 56R and trunnion plate 60. Attachement means, such as extension plates 58, are adapted for receiving fasteners, such as bolts, to positively attach a work piece to the support structure ring 55. Handles 59, built into ring 55, aid in the manipulation of the collar and attached work piece.

FIG. 3 illustrates the manner in which retention collar 50 detachably mates with the remainder of the cart. Left and right cart frame members 20L, 20R space rotatable bearing members 30L, 30R so that they may engage collar trunnions 56L, 56R respectively.

Slot 42 in bearing member 30 is dimensioned to engage trunnion 56 of retention collar 50. Trunnion 56 is inserted into slot 42 to a bearing position 44. Spring loaded latching member 48 retains trunnion 56 in the bearing position. Bearing position 44 is not on the axis of rotation of bearing member 30. Therefore, rotation of bearing member 30 raises and lowers bearing position 44 and hence raises and lowers collar 50 including any retained work piece. A spring-loaded locking pin, bearing/plate pin 34, passes through a bore in bearing member 30 for engaging one or more bores 62 in trunnion plate 60 so that the retention collar 50 may be rotated while held in the bearing position and then locked into one of several positions relative to bearing member 30.

A collar may have a single trunnion plate 60, as illustrated on retention collar 50 in FIG. 4, or a collar may have a trunnion plate 60 adjacent each trunnion as illustrated on the assembly collar 50' in FIG. 5.

Figure 2:
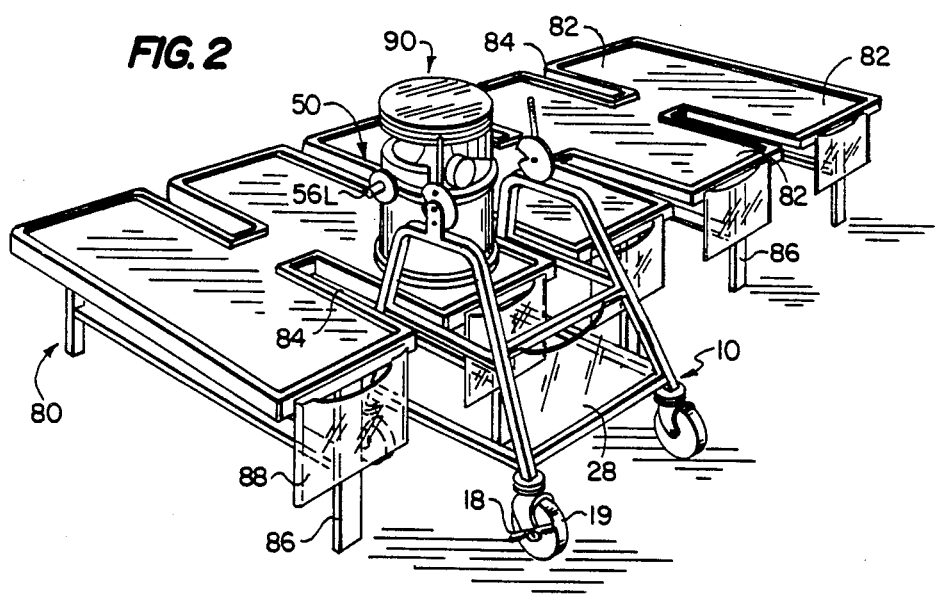
FIG. 2 illustrates an embodiment of the present invention used in combination with a work/storage table, which is designed to accomodate the cart.

FIG. 2 illustrates the cart 10 as used in conjunction with a storage or work bench, shown generally as 80. In the illustration, retention collar 50 is attached to a missile guidance assembly, shown generally as 90, such that the height of trunnions 56 is equal to the height of slot 42 in bearing member 30 when the slot is in a horizontal position. Alternatively, if the clamping collar of FIG. 4 is used, the collar may be retained in position at bearing position 44 of bearing member 30 and hinged clamping member 52 opened to accomodate the work piece and to fit around and secure the work piece. Upon securing the work piece to collar 50, trunnions 56 are locked with latched member 48 into the bearing position 44. Bearing members 30 are rotated by grasping handles 40 to raise the collar to the position shown in FIG. 3. This movement therefore, also raises the attached work piece. Frame 20 is so configured that any work pieces held in the collar can be rotated so that they may be worked on or transported in various positions.

FIG. 6 illustrates a work piece 90, such as a missile guidance assembly, to which the assembly collar 50' of FIG. 5 has been attached, and which has been rotated 180 degrees while supported by the cart. The guidance assembly 90 shown is generally comprised of electronic plates 96 and RF antenna 97. The flipped-over position of the missile guidance assembly as shown in FIG. 6, allows a rejected electronic plate to be removed and replaced by spacers 98. The assembly can then be placed on a work bench or storage bench. Assembly collar 50' can also be used for holding the electronic plates 96 during assembly. The top electronic plate 99 is attached to support structure ring 55 and assembly collar 50' and placed into the cart. The assembly collar 50' is rotated in the bearing position to turn the workpiece upside down, where it is locked in place. The other electronic plates 96 may then be placed onto each other and bolted together while the entire assembly is held on the cart.

FIG. 7 shows the cart 10 of the present invention transporting a work piece 90, such as a completed missile guidance assembly including shroud 91 and assembly/storage legs 92.

With reference once again to FIG. 2, there is shown a work/storage bench 80 particularly adapted for use with the cart 10 of the present invention. Bench 80 includes a plurality of assembly/storage platforms 82 for holding a work piece 90 during assembly or storage. Slits 84 are adapted to accomodate left and right side frames 20L and 20R of cart 10. Slits 84 allow the cart to engage a work piece on or over platform 82. Bench 80, including slits 84, is designed so that nothing impedes cart 10 from engaging a work piece 90 on or over a platform. Therefore, the platform support structure, such as legs 86, is directly under the platform. Attached to each platform is a platform document holder 88 for containing the printed information associated with a work piece on the platform. Cart frame 20, is so configured that the front of frame 20 contains no members which would interfere with engagment of a work piece on bench 80. In the preferred embodiment of cart 10 shown in FIG. 1, there are no cross members between left side frame 20L and right side frame 20R on the front side 21 of frame 20 that would interfere with components of bench 80 in engaging a work piece over platform 84.

From the foregoing description, it is seen that the present invention provides an improved method and apparatus to support a workpiece, particularly a missile guidance assembly, during assembly to raise the work piece from the work/storage platform, to transport the work piece to the next platform, and to lower the work piece onto the work/storage platform for the next operation.

The invention also provides the method and appartus to grip the work piece around the center and lock it onto the transport cart where it may be rotated for inspection or assembly.

Although a particular embodiment of the invention has been illustrated and described, modifications and changes will become apparent to those skilled in the art, and it is intended to cover in the appended claims such modifications and changes as come within the true spirit and scope of the invention.

I claim:

1. A workpiece transport cart assembly, comprising:
   a retention collar for rigid attachment to a workpiece, the collar having a pair of trunnions projecting from opposite sides of the collar, the center axis of the trunnions defining a collar mounting axis;
   a transport cart for releasably supporting said retention collar, the cart including a movable base, a frame attached to the base, and a pair of bearing members rotatably mounted on the frame, the bearing members being spaced apart and each being positioned for releasably engaging a respective one of said trunnions;
   each bearing member having a slot for engaging a respective one of said trunnions, the inner end of each slot comprising means for rotatably supporting a respective trunnion and being at a position spaced from the axis of rotation of said bearing member on said frame;
   first locking means for releasably locking said bearing members in a selected position against rotation relative to said frame; and
   second locking means for releasably locking said trunnions in a selected position against rotation relative to said respective bearing members.

2. The assembly as claimed in claim 1, wherein the cart frame includes a left side frame and a right side frame spaced from said left side frame, one of said bearing members being rotatably mounted on said left side frame and other other bearing member being rotatably mounted on said right side frame for rotatably supporting said retention collar between said left and right side frame.

3. The assembly as claimed in claim 1, wherein each of said bearing members has a series of spaced bores, and said first locking means comprises a pair of locking pins mounted on said frame and positioned for locking engagement with the bores in corresponding ones of said bearing members, each bore corresponding to a selected orientation of said bearing member slot, including horizontal and vertical orientations.

4. The assembly as claimed in claim 1, wherein said retention collar includes a pair of trunnion plates on its opposite sides from which said trunnions project, each trunnion plate having a series of spaced bores around its periphery, and said second locking means comprises a locking pin on each of said bearing members positioned for locking engagement in a selected bore in the corresponding trunnion plate, each bore corresponding to a selected orientation of said retention collar relative to said frame, including horizontal and vertical orientations.

5. In combination, a workpiece table and transport assembly, the transport assembly comprising:
   a transport cart assembly for lifting, supporting, transporting and lowering a workpiece, the cart assembly including a movable base and right and left side frames projecting upwardly from said base, a first bearing member rotatably mounted on said right side frame and a second bearing member rotatably mounted on said left side frame, each bearing member having a slot;
   a retention collar for rigid attachment to a workpiece, the retention collar having a pair of trunnions projecting from its opposite sides for engagement in respective ones of said bearing member slots, said bearing member slots comprising means for rotatably supporting said respective trunnions;
   first locking means for releasably locking said bearing members in a selected orientation relative to said right and left side frames; and
   second locking means for releasably locking said retention collar in a selected orientation relative to said bearing members;
   said workpiece table having a support surface dimensioned for fitting between said left and right side frames to permit said cart and said retained retention collar to engage a workpiece on said support surface; and support legs for supporting said surface at a raised level above the ground; said cart base having an opening at one end to permit said base to be moved under said support surface with said left and right side frames on opposite sides of said base and said collar supported above said support surface.

6. The combination of claim 5, wherein said table includes a plurality of said support surfaces and has slotted openings separating adjacent support surfaces, the width of each slotted opening being less than that of one of said cart side frames to permit entry of said cart side frames into openings on each side of a respective support surface.

* * * * *